United States Patent [19]

Turrell

[11] Patent Number: 5,020,202

[45] Date of Patent: Jun. 4, 1991

[54] TOOL TO CLIP TOGETHER SHEET METAL ENDS

[76] Inventor: James A. Turrell, 1040 Camp Four Jacks Rd., Biloxi, Miss. 39532

[21] Appl. No.: 432,790

[22] Filed: Nov. 6, 1989

[51] Int. Cl.[5] .............................................. B23P 11/00

[52] U.S. Cl. .................................................. 29/243.56

[58] Field of Search ...................... 29/243.56, 270, 278, 29/267, 268; 254/113

[56] References Cited

U.S. PATENT DOCUMENTS

| | | | |
|---|---|---|---|
| 1,809,386 | 6/1931 | Mason | 29/243.56 |
| 1,977,459 | 10/1934 | Smartwood | 29/243.56 |
| 3,160,890 | 12/1964 | Lefebvre | 29/243.56 |
| 3,378,911 | 4/1968 | Clark et al. | 29/267 |
| 3,688,380 | 9/1972 | Nofmann et al. | 29/243.56 |

FOREIGN PATENT DOCUMENTS

| | | | |
|---|---|---|---|
| 1236333 | 6/1960 | France | 29/243.56 |

*Primary Examiner*—Robert C. Watson
*Attorney, Agent, or Firm*—Alexander Norcross

[57] ABSTRACT

A tool for installing a spring clip for clipping together extensions for sheet metal. An angled handle terminates in an extended underlip at an operating end. A jaw having a flat bottom face and a hooked end is pivotally affixed, offset from the underlip. The underlip is curved to form a pushing face, opposed to the hook on the jaw.

The tool is used to install a spring clip on sheet metal extensions, placing one end of the spring clip across a sheet metal extension and hooking the sheet metal extension and clip together with a jaw hook. By pivoting down the handle, the underlip presses against the opposing sheet metal extension forcing the extensions together and forcing the jaw face down over the spring clamp clipping the clamp over the sheet metal extensions, installing the clip.

2 Claims, 3 Drawing Sheets

TOOL TO CLIP TOGETHER SHEET METAL ENDS

BACKGROUND OF THE INVENTION

This invention relates to tools for installing clips or fastenings, especially spring clips, to hold together assembled structures.

Schroeder, U.S. Pat. No. 1,664,529 discloses a tool for clamping a rail anchor onto a railroad rail. Schroeder discloses an elongate handle having a pivoting jaw member with an enclosed hook for gripping and holding the opposite end of the anchor, the near end of the bar being faced with a jaw for gripping the anchor and displacing it into clamping relationship with the rail.

Hansen, U.S. Pat. No. 2,036,140 disclosing a T-wire staple bender, so described as fastening wire clips against the flange and web of a T-cross section fence post discloses a handle having a fixed jaw for gripping the far side of the fencepost, a gap within the jaw for curbing the wire clip around the near side of the fence post; and an extended pivoting hook with a specially shaped cross section for pulling the free end of the wire clip down across the web of the fence post. This tool would tend to hold together a T-connector only by reason of the curve of the tool (31 prime) being accurately machined to the width of a particular T as gripped by the tool.

U.S. Pat. No. 4,663,558 to Spaulding discloses a spring clip tool having two opposed jaws for compressing a spring clip together into a clamped position, the jaws containing a specific cam mechanism for driving the spring clip down around an extending post (22) and then up into joined relationship with the spring clip.

A related Spaulding patent, U.S. Pat. No. 4,610,187 discloses a simpler form of clamp having opposed jaws specifically for the spring clip; this device relates specifically to the particular described structure of the face of the jaws which is claimed to facilitate the overlapping and clipping action of the spring clip.

U.S. Pat. No. 4,583,279 in the course of claiming a particular method of using C-rings to clamp upholstery (automotive seat covers) to a particular form of anchor track for easy manufacture of an upholstery item, shows the use of a simple pivoting jaw device (50) to clamp the C-clips between the fabric and the anchor track. This device draws the two pieces to be joined together as well as fastening a clip between them.

U.S. Pat. No. 4,525,976 to Simpson is an apparatus for assembling seam roofs, pertinent in regards to sheet metal seams. This is a disclosure of a particular form of clamp and two simplified hand tools, a curved bar, and a hand held U-channel for pressing the sheet metal clamps down against the curved bar.

SUMMARY OF THE INVENTION

In sheet metal construction, sections of sheet metal end in sheet metal extensions which are abutted back to back to form a T-shaped section which is then secured by snapping a wide flexible spring clip over the top of the T-section. The typical prior art method of assembling these sections is to pound the spring clip with a hammer to attempt to drive it over the sheet metal extensions. These blows tend to drive the back to back sheet metal extensions apart, as there is nothing retaining them. It also damages the clip and creates an unsuccessful joinder.

The tool of the invention is of a width substantially equal to that of a typical spring clip. It comprises a handle, with an underlip forming a pusher face, having an offset pivoted jaw member with an end hook. The tool is used, as shown in the drawings, by hooking the far end of the clip and extensions with the pivoting jaw hook and by pushing down on the handle. The underlip pushes against the opposing sheet metal extension, forcing the sheet metal extensions together between the opposing force of the hook and underlip. The geometry of the tool is such that as the lever is pushed down, the jaw is pushed down and across the spring clip forcing the clip down into a gripping relationship with the sheet metal extensions, forming the desired T-shaped section, clipping together the individual sheet metal extensions.

The pivoting member of the jaw is shaped as and functions as a hook; the fixed end of the tool, or underlip, extending from the handle is a pushing face, not a hook. The cutaway section is merely to clear the protruded section of the cap.

DETAILED DESCRIPTION OF THE PREFERRED EMBODIMENT

Figure 1:
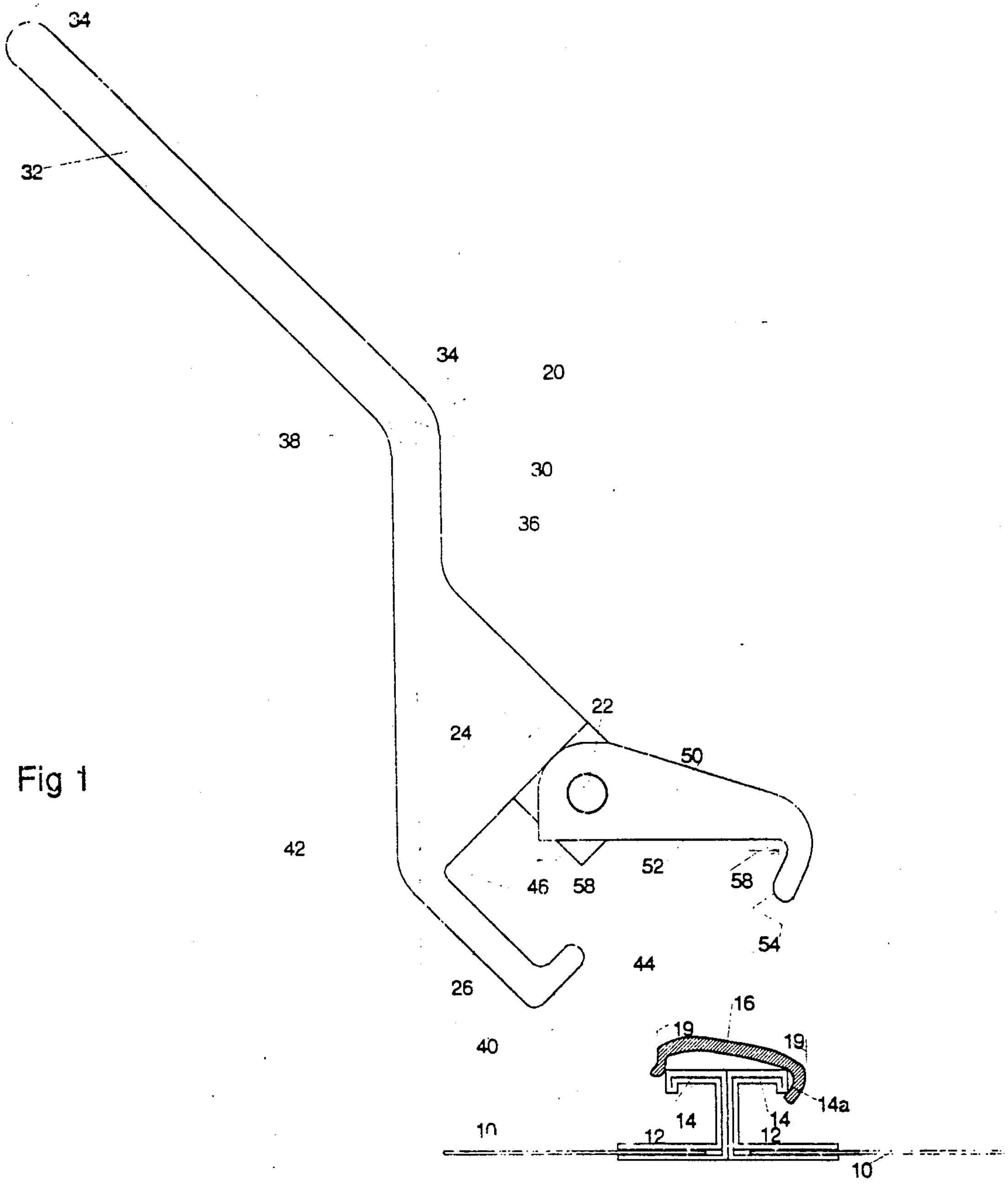
FIG. 1 is a side view of the tool in position to engage a spring clip.
Figure 2:
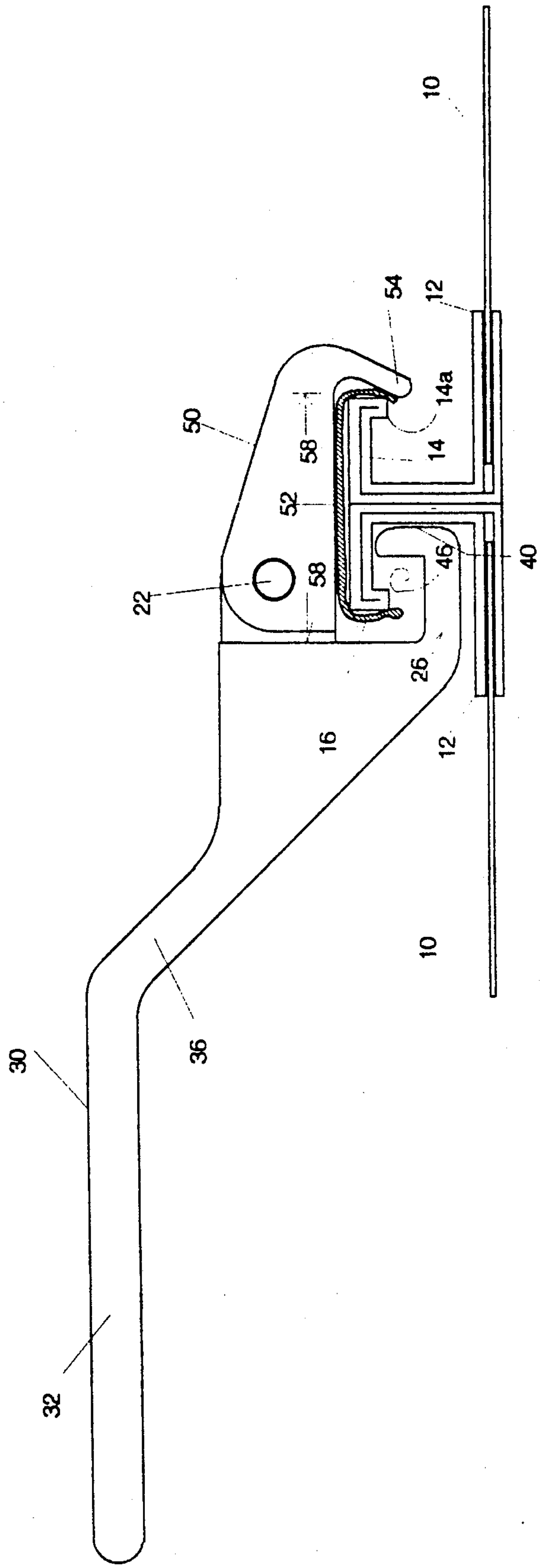
FIG. 2 is a side view of the tool in engaged position.
Figure 3:
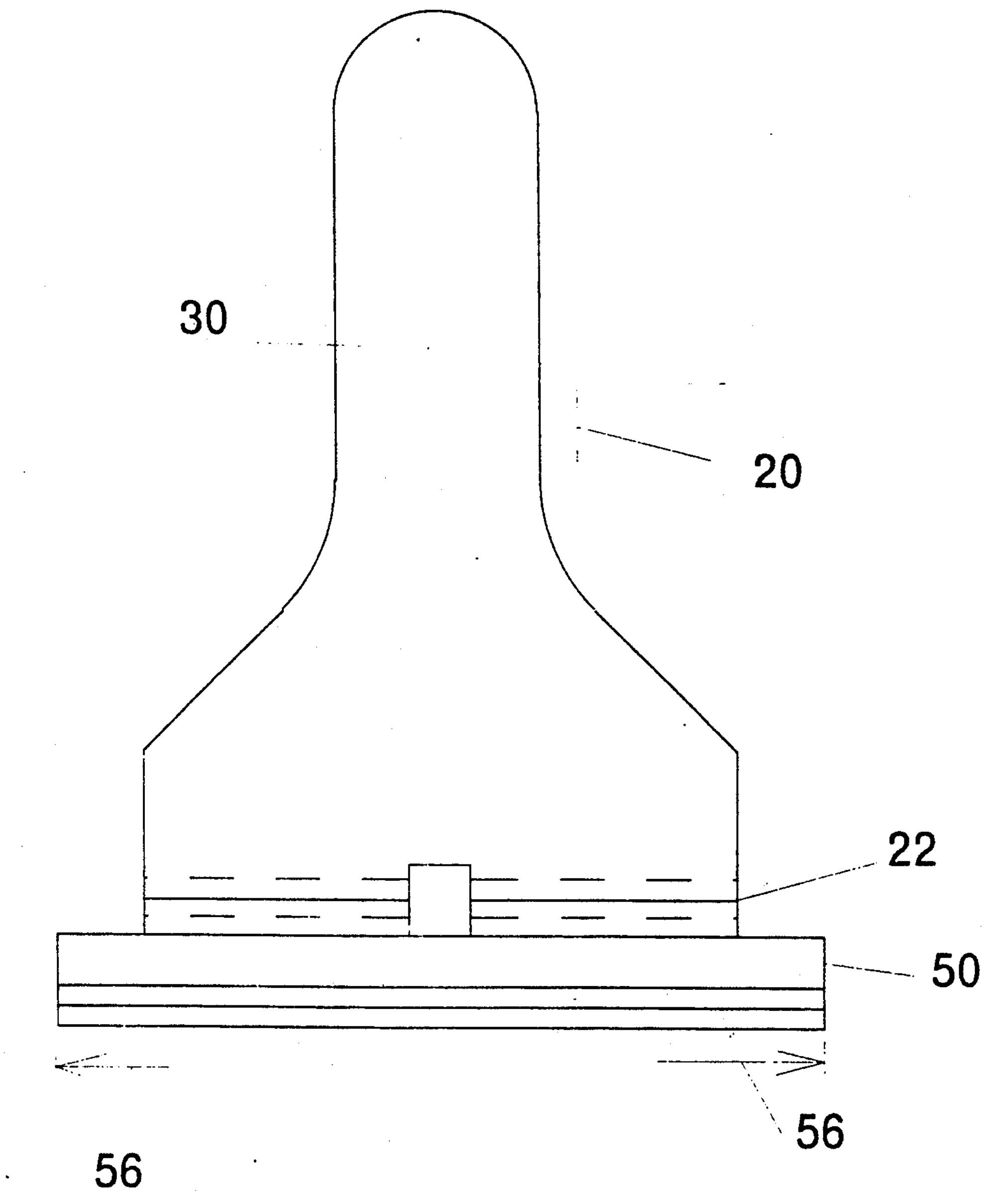
FIG. 3 view of an embodiment of the tool, showing relative width of the tool.

The drawings, taken together, show the tool 20 for fastening together assemblies of sheet metal 10.

In assembling sheet metal sheets 10, such as for a roof, it is typical to slide a sheet metal extension or cap 12 onto the edges of each sheet of sheet metal; the sheet metal extensions 12 abut, back to back, presenting an outwardly extending head 14 having a generally T-shaped configuration. The sheet metal extensions are then secured in place by installing an elongate spring clip 16, a generally C-shaped clip having a flexible spring shape designed to compress the heads 14 of the sheet metal extensions 12 together, forming a tight fastening of adjacent sheet metal sheets 10.

The sheet metal clip installation tool 20 of the invention comprises an elongate handle 30 extending from a first handle section 32, adapted to be gripped by the user, extending a distance 34 to a handle midsection 36 which is offset by an angle of extension 38. The offset of the handle midsection 36 serves to provide for a hand clearance for the user in manipulating the tool 20, as will be seen.

Handle midsection 36 then terminates in an underlip or extension 26, which ends in forming a pusher face 40. Extension 26 is angularly offset from midsection 36 by an angular offset 42 so that extension 26 is essentially extending in line with first handle section 36. The underlip or extension 26 extends from handle midsection 36, but at an angular offset 42 so as to be substantially parallel to first section 32; extension 26 ends in a tip hook 44, the upper face of which is pusher face 40.

Tip hook 44 is a vertical extension or tip on extension 26 which provides an additional vertical extension for pusher face 40. Tip 44 extends upward from extension 26 to a point adjacent jaw 50; it further defines a clearance recess 46. During use, recess 46 clears tool 20 from interference with head 14 of the sheet metal extensions 12.

Extension 26 is offset a lateral offset distance 24 from a hinge point 22 on tool 20. Pivotally affixed at hinge point 22 is jaw 50, a flat wide jaw member extending from hinge point 22 a length 58 terminating in a downward facing engaging hook 54. Jaw engaging hook 54 and pusher face 40 are opposed to one another in direction. Although they are laterally offset by lateral offset distance 24, tip 44 extends pusher face 40 so that hook 54 and face 40 are substantially opposed when the tool 20 is closed down.

Jaw 50 further forms an extending flat spring clip engaging face 52, the face of jaw 50 between hinge point 22 and engaging hook 54.

In use, adjacent sheets of sheet metal 10 are terminated in sheet metal extensions 12 forming a substantially T-shaped head 14 as the sheet metal extensions 12 are abutted back to back. The structure is made rigid and clipped by installing an elongate spring clip 16 over the head 14. Spring clip 16 is typically four or five inches in length. Clip 16 has a width 19 which matches the width of the assembled head 14 of the sheet metal extensions 12.

Spring clip 16 is installed upon the sheet metal extensions 12 by hooking one edge of the spring clip 16 at the far end 14a of one of the sheet metal extensions 12, holding the spring clip in place by the pressure of the engaging hook 54.

Handle 30 is then depressed, engaging pusher face 40 against the second sheet metal extension 12. The lever arm resulting from the lateral offset distance 24 between pusher face 40 and engaging hook 54, acting through the friction of pusher face 40 against the second sheet metal extension 12, produces a strong downward force on the spring clip 16 through the downward motion of pressure exerted by clip engaging face 52.

Tip 44 simultaneously presses upward on head !4 of the second sheet metal extension 12, maintaining alignment of the sheet metal extensions 12 against the assymetrical downward force otherwise exerted by the spring clip 16 as it is pressed downward by clip engaging face 52. This upward force of tip 44 prevents a downward shifting of the second sheet metal extension 12 which would otherwise occur under the downward force of the spring clip 16, preventing spring clip 16 from engaging. Since spring clip 16 cannot force second sheet metal extension 12 downward against the upward force of tip 44, it must deform sufficiently to snap around the head 14. Clearance recess 46 provides ample room for the resulting deformation and movement of spring clip 16.

By making the jaw 50 of a jaw width 56 substantially equal to the length of a spring clip 16, a uniform pressure is exerted upon the entire spring clip 16, snapping it smoothly into place around the head 14 of the sheet metal extensions 12. It is preferred that the jaw length 58 between hinge point 22 and engaging hook 54 be fairly close to the width 19 of spring clip 16.

The tool 20 mates easily with the spring clips 16 enabling the rapid smooth assemblage of a series of sheet metal extensions 12 with a plurality of clips 16, and without damaging the clip 16 or driving apart the extensions 12. The tool 20 thus permits rapid and easy assemblage of a series of sheet metal extensions with minimum error, misalignment or damage.

It can be readily seen that minor variations in the shape and structure of the tool may be obtained and the invention therefore tends to that wider body of equivalents as are claimed.

I claim:

1. A tool for positioning a spring clip to anchor adjacent, opposing sheet metal extensions comprising:
- a handle member;
- an end on said handle member defining a pusher face;
- a jaw, pivotally affixed to said handle member, offset from said pusher face;
- said jaw having a free end;
- means upon said free end for engaging a sheet metal extension in a direction opposed to said pusher face;
- a face upon said jaw for exerting a downward force upon said spring clip.
- said handle member further comprising:
  - a first handle section extending a distance;
  - a handle midsection extending at an angle from said first handle section;
  - said pusher face being offset from said midsection.

2. A tool for positioning a spring clip to anchor adjacent, opposing sheet metal extensions comprising:
- a handle member;
- an end on said handle member defining a face means for supporting a sheet metal extension against displacement;
- a jaw, pivotally affixed to said handle member, offset from said pusher face;
- said jaw having a free end;
- means upon said free end for pushing a sheet metal extension in a direction opposed to said face means;
- a face upon said jaw for exerting a downward force upon said spring clip;
- said pusher face being of a substantial width corresponding to said spring clip;
- said jaw being of a width substantially equal to the width of said pusher face;
- a first handle section extending a distance;
- a handle midsection extending at an angle from said first handle section; said pusher face being offset from said midsection.

* * * * *